United States Patent
Naim et al.

(10) Patent No.: US 11,827,952 B2
(45) Date of Patent: Nov. 28, 2023

(54) PROCESS FOR RECOVERING GOLD FROM ORES

(71) Applicant: BROMINE COMPOUNDS LTD., Beer-Sheva (IL)

(72) Inventors: Ronen Naim, Beer-Sheva (IL); Ronny Costi, Gedera (IL); Hanan Sertchook, Gedera (IL); Ran Elazari, Mobile Post Negev (IL)

(73) Assignee: BROMINE COMPOUNDS LTD., Beer-Sheva (IL)

( * ) Notice: Subject to any disclaimer, the term of this patent is extended or adjusted under 35 U.S.C. 154(b) by 10 days.

(21) Appl. No.: 17/437,591

(22) PCT Filed: Mar. 12, 2020

(86) PCT No.: PCT/IL2020/050291
§ 371 (c)(1),
(2) Date: Sep. 9, 2021

(87) PCT Pub. No.: WO2020/183469
PCT Pub. Date: Sep. 17, 2020

(65) Prior Publication Data
US 2022/0178000 A1    Jun. 9, 2022

Related U.S. Application Data

(60) Provisional application No. 62/817,578, filed on Mar. 13, 2019.

(51) Int. Cl.
*C25C 1/00* (2006.01)
*C22B 11/00* (2006.01)
(Continued)

(52) U.S. Cl.
CPC .............. *C22B 11/04* (2013.01); *C22B 3/045* (2013.01); *C25C 1/20* (2013.01)

(58) Field of Classification Search
CPC ............ C22B 11/04; C22B 3/045; C25C 1/20
See application file for complete search history.

(56) References Cited

U.S. PATENT DOCUMENTS

| 4,684,404 A | 8/1987 | Kalocsai |
| 4,904,358 A | 2/1990 | Hess |

(Continued)

FOREIGN PATENT DOCUMENTS

| EP | 0 476 862 | 3/1992 |
| RU | 2749792 | 6/2021 |
| WO | 2017/199254 | 11/2017 |

OTHER PUBLICATIONS

International Search Report for PCT/IL2020/050291 dated Jun. 5, 2020, 5 pages.
(Continued)

*Primary Examiner* — Zulmariam Mendez
(74) *Attorney, Agent, or Firm* — Nixon & Vanderhye PC

(57) ABSTRACT

A process for recovering gold from a refractory gold ore, comprising the steps of: electrolyzing a mixture consisting of the ore particles and an aqueous bromide solution in an electrolytic cell having anode and cathode, wherein bromine is produced at the anode by oxidation of the bromide, thereby dissolving gold in the aqueous phase; separating the ore particles from the aqueous phase to obtain a leach liquor; adjusting the pH of the leach liquor to the alkaline range to produce a gold-containing precipitate; collecting the gold-containing precipitate and recycling a bromide-containing barren solution for reuse as an aqueous bromide feed solution.

5 Claims, 5 Drawing Sheets

(51) Int. Cl.
*C22B 3/04* (2006.01)
*C25C 1/20* (2006.01)

(56) References Cited

U.S. PATENT DOCUMENTS 5,620,585 A * 4/1997 Dadgar .................... C25C 1/20
                                                    205/625
2004/0168909 A1 * 9/2004 Larson .................... C25C 7/02
                                                    204/233

OTHER PUBLICATIONS

Written Opinion of the ISA for PCT/IL2020/050291 dated Jun. 5, 2020, 8 pages.
Melashvili et al., "Study of Gold Leaching with Bromine and Bromide and the Influence of Sulphide Minerals on this Reaction", Research Gate—Conference Paper, Oct. 1, 2014, 14 pages.
Aylmore et al., "Chapter 27. Alternative Lixiviants to Cyanide for Leaching Gold Ores", May 17, 2016, pp. 447-484.
Syed, "Recovery of gold from secondary sources—A review", Hydrometallurgy, vol. 115-116, Mar. 1, 2012, pp. 30-51.
Trindade et al., "Recovery of gold from ores with bromide containing solutions", Proceedings of the International Mineral Processing Congress, vol. 4, Jan. 1, 1995, pp. 83-86.
Hilson et al., "Alternatives to cyanide in the gold mining industry: what prospects for the future?," Journal of Cleaner Production, Nov. 14, 2006, pp. 1158-1167.
Mar. 9, 2023 Office Action issued in Eurasian Patent Application No. 202192348, pp. 1-4.

* cited by examiner

Prior Art (EP 476862)

| | 1 | 2 | 4 | 5 | 6 | 3 |
|---|---|---|---|---|---|---|
| Au | 46.28 | 76.43 | 26.06 | 40.76 | 73.91 | |
| O | 10.91 | 4.95 | 24.12 | 19.7 | 9.02 | 28.58 |
| Mg | 5.12 | 1.8 | 12.34 | 7.43 | 3.05 | 20.69 |
| Br | 3.43 | 0.59 | 7 | 5.42 | 1.46 | 9.57 |
| Si | 2.48 | 0.48 | 4.43 | 3.92 | 1.02 | 5.73 |
| S | 2.48 | 0.46 | 2.44 | 1.93 | 0.65 | 2.45 |
| Ca | 0.86 | 0.46 | 1.98 | 1.73 | 0.68 | 2.66 |
| Mn | 3.32 | 3.07 | 5.64 | 4.67 | 2.18 | 5.7 |
| Fe | 4.7 | 5.66 | 10.26 | 5.9 | 2.93 | 20.24 |
| Cu | 6.23 | 3.28 | 1.73 | 3.16 | 2.9 | 1.18 |
| Zn | 14.19 | 2.81 | 4.02 | 5.38 | 2.19 | 3.19 |

| | 1 | 2 |
|---|---|---|
| Au | 43.8 | |
| O | 21.02 | 30.15 |
| Br | 10.48 | 24.43 |
| Al | 4.14 | 10.95 |
| Si | 2.84 | 5.37 |
| S | 1.32 | 2.32 |
| Ca | 1.09 | 1.95 |
| Mn | 6.14 | 6.33 |
| Fe | 6.74 | 12.1 |
| Cu | 0.37 | 1.46 |
| Zn | 2.07 | 4.94 |

PROCESS FOR RECOVERING GOLD FROM ORES

This application is the U.S. national phase of International Application No. PCT/IL2020/050291 filed Mar. 12, 2020 which designated the U.S. and claims priority to U.S. Provisional Application No. 62/817,578 filed Mar. 13, 2019, the entire contents of each of which are hereby incorporated by reference.

Cyanidation is the most common method used by the gold mining industry to extract gold from gold-bearing ores. An aqueous leaching medium that contains elemental bromine ($Br_2$) in conjunction with bromide ($Br^-$), hereinafter the bromine/bromide lixiviant, is a potential replacement for cyanide, because it can leach gold from ores by oxidizing the precious metal, dissolving the gold in an aqueous solution to form $AuBr_2^-$ and/or $AuBr_4^-$ complexes. The particulate ore is then separated from the gold-containing aqueous phase (pregnant leach solution; PLS). The pregnant leach solution will be treated to recover the gold.

For example, it has been shown in U.S. Pat. No. 4,684,404 that metallic gold can be dissolved in an aqueous solution in the presence of sodium bromide and elemental bromine, e.g., in an aqueous reagent comprising 1.0% v/v $Br_2$ and 1.0% v/v sodium bromide. It was also pointed out in U.S. Pat. No. 4,684,404 that the gold/bromine complexes formed in the aqueous solution could be extracted with the aid of organic solvents such as methyl isobutyl ketone (MIBK), di-isobutyl ketone (DIBK) and ethyl ether. Other techniques for use in recovering gold from PLS that are mentioned in U.S. Pat. No. 4,684,404 are electrodeposition, carbon adsorption and ion exchange.

The action of the bromine/bromide lixiviant on various ores was also investigated by Melashvili et al [Conference of Metallurgists Proceedings ISBN: 978978-1-926872-24-7, published by the Canadian Institute of Mining, Metallurgy and Petroleum].

Use of electrolytically-generated bromine to leach gold by direct treatment of gold-bearing ore in a tank where free bromine is made by electrolyzing bromide solution is described in U.S. Pat. No. 4,904,358. Sodium bromide solution is fed to a tank loaded with the ore. The solution flows downwardly through the ore to be leached. A pair of electrodes mounted in the tank are connected to a power source. Electrolysis takes place and elemental bromine is generated from the bromide. The bromine is available to attack the gold, which dissolves in the aqueous phase. The pregnant leach solution is separated from the ore. With the aid of zinc cementation (addition of metal zinc—a strong reducing metal), the precious metals can be recovered from the PLS.

However, the major motive to incorporate electrolytic generation of bromine into gold recovery technology is for efficient recycling of bromide ions that are produced after bromine oxidizes the gold, namely, to re-oxidize the bromide ions to elemental bromine for reuse in the process. Processes based on this approach—bromide re-oxidation to elemental bromine by electrolysis—were described in EP 476862 and WO 2017/199254, illustrating processes for gold recovery consisting of three major steps. In the first step gold ore is leached with the bromine/bromide lixiviant. The slurry is separated by filtration into a solid and an aqueous phase which contains the $AuBr_2^-/AuBr_4^-$ ions, that is, the pregnant leach solution. In the second step, gold is removed from the pregnant leach solution by passing the solution through a column loaded with anion exchange resin, carbon adsorption, zinc cementation or solvent extraction (EP 476862) or by solvent extraction using phosphorous or amine extractant with specific stripping method (WO 2017/199254). The depleted bromide solution formed is replenished. Next, in the third step, the bromide solution amenable to electrolysis passes through one or more electrolytic cells to oxidize bromide to elemental bromine, to produce an aqueous bromine solution that is recycled and used in the leaching step. In this way, closed-loop based technology is provided, with efficient bromine utilization.

Another process design based on electrolytically-generated bromine is shown in FIG. 1 (FIG. 7 of EP 476862). An electrochemical cell (83) is divided to anodic (91) and cathodic (93) compartments by means of a cation exchange membrane (89).

The goal is to have the pregnant leach solution releasing its gold value by gold electrodeposition onto the cathode, with bromine production in the anode side. The anolyte consists of an acidic bromide solution. Bromine is produced in the anodic side and an aqueous bromine solution is supplied to a leaching tank (97). Following liquid/solid separation (99), the leach liquor is led to the cathodic side, where gold is plated onto the cathode. It is indicated in EP 476862 that the pH of the cathode feed solution is highly acidic. Outgoing catholyte stream is fed to a makeup tank (101) and replenished by addition of alkali bromide, creating an anolyte feed solution.

Gold-bearing ores which are not readily amenable to cyanidation are known as "refractory ores". Refractory ores as well as leach residues (a type of waste generated by mines, known as "tailings") have always posed challenges to the gold mining industry. The present invention relates to the leaching of gold with the aid of electrolytically-generated bromine from such gold sources.

A major type of a refractory gold ore which is resistant to cyanidation is a sulfide-containing ore. That is, an ore that contains sulfide minerals (such as pyrite, pyrrohotite and stibnite), which are impermeable to the leaching solution. Consequently, the leaching solution cannot easily reach gold locked in the sulfide minerals. Sulfide-containing refractory ores are therefore processed by roasting, to convert the sulfide to oxide, or by other oxidative pretreatment methods, before they can be subjected to leaching (i.e., by cyanidation). The bromine/bromide lixiviant presents an alternative to cyanidation in leaching a refractory gold ore, on account of its ability to simultaneously oxidize sulfide and gold. But it has been shown [supra; Conference of Metallurgists Proceedings ISBN] that bromine consumption in leaching a refractory gold ore, to reach ~70% extraction, is high (>500 kg/ton). Experimental results reported herein are more or less consistent with this finding. These observations imply that to satisfy the demand of a refractory gold ore for large bromine quantities, either direct addition to the leaching reactor of elemental bromine (with its high vapor pressure and corrosive nature), or the supply of excessively large volumes of bromine/bromide aqueous reagent, would be needed.

Other types of refractory ores have gold in association with carbonaceous matter, or gold in solid solution with other minerals such as arsenic, iron, copper, antimony and tellurium.

We have now found a process design that eliminates the aforementioned complications of leaching refractory ores and additionally incorporates an effective gold recovery step. In one variant of the process, extraction of gold from a refractory ore by the bromine/bromide lixiviant and separation of the metal from the leach liquor are both accomplished electrolytically in a simultaneous manner. Bromine produced at the anode by oxidation of bromide in an aqueous solution dissolves gold from a refractory ore that is added to, or circulated through, the anodic side of an electrolytic cell. On removal of the ore particles, a leach liquor with the soluble $AuBr_2^-/AuBr_4^-$ complexes is obtained. An alkaline environment created by production of hydroxide ions at a cathode upon electrolyzing such leach liquor enables gold recovery through precipitation of one or more insoluble gold forms in the cathodic compartment. The precipitate was collected; we have found that the concentration of gold in the barren solution is acceptably low, indicating good gold recovery by the alkaline-driven precipitation. Indeed, gold was detected upon re-dissolving the precipitate in aqua regia. Without wishing to be bound by theory, mechanisms that may account for the recoverability of gold from an alkaline electrolyzed leach liquor include chemical precipitation of $Au^{3+}$ from the solution as $Au(OH)_3$; chemical precipitation of sulfide or sulfate of $Au^{1+}$ and/or $Au^{3+}$; or reductive precipitation of $Au^{(0)}$ from the bulk solution, alongside other hydroxides. Electrodeposition of gold onto the cathode seems to play a minor role in winning the gold from an alkaline electrolyzed leach liquor.

The invention therefore relates to a process for recovering gold from a refractory gold ore, comprising the steps of:
electrolyzing a mixture consisting of the ore particles and an aqueous bromide solution in an electrolysis cell having anode and cathode, wherein bromine is produced at the anode by oxidation of the bromide, thereby dissolving gold in the aqueous phase;
separating the ore particles from the aqueous phase to obtain a leach liquor;
adjusting the pH of the leach liquor to the alkaline range to produce one or more gold-containing precipitates;
collecting the gold-containing precipitate (s) and recycling a bromide-containing barren solution for reuse as an aqueous bromide feed solution.

It should be noted that gold recovery from the leach liquor can be carried out downstream to the leaching step, by addition of an alkaline agent (e.g. alkali hydroxide) to the leach liquor, reaching pH >7.5, e.g., 8 to 12, or by electrolyzing the leach liquor. That is, the leaching of the ore with the aid of anodically-produced bromine and gold separation from the leach liquor by basification are carried out successively. Thus, in one variant of the invention, the pH of the leach liquor is shifted to the alkaline range by electrolyzing the leach liquor in an electrolysis cell having anode and cathode (a second electrolytic cell), whereby hydroxide ions are produced at a cathode upon water reduction to create an alkaline environment.

However, as mentioned above, a more elegant approach towards leaching gold from a refractory ore and gold separation from a pregnant leach solution involves simultaneously using anodically-generated bromine to dissolve gold from a refractory ore, and cathodically-generated hydroxide to precipitate gold-containing solid from a pregnant leach solution. The process can be run either in a batch reactor consisting of a non-divided/divided electrolytic cell, or in semi-continuous mode, e.g., with circulation of an anolyte and catholyte streams through two separate flow loops, the anolyte stream being the ore suspended in aqueous bromide and the catholyte stream consisting of a pregnant leach solution that was produced in a previous run. We use the term "leach liquor" to indicate the aqueous phase separated from an ore residue after a certain ore batch was leached with the bromine/bromide lixiviant; a "pregnant leach solution" in the context of the present invention is a broader term, it may be a leach liquor obtained from earlier runs of the process using a different batch of a refractory ore. The PLS typically contains residual $Br_2$, e.g., up to 1.2 wt %.

Accordingly, the invention provides a process for recovering gold from a refractory gold ore in an electrolytic cell having anodic and cathodic compartments, comprising the steps of:
feeding an anolyte to the anodic compartment, the anolyte being a mixture of the ore particles and an aqueous bromide solution; feeding a catholyte to the catholyte compartment, the catholyte being $AuBr_2^-$ and/or $AuBr_4^-$ ions-containing pregnant leach solution, which was obtained after the leaching of a refractory gold ore with an aqueous bromine/bromide lixiviant;
applying an electrical voltage across the electrodes, thereby oxidizing bromide to bromine at the anode to dissolve gold in the anolyte and reducing water at the cathode to create an alkaline environment to precipitate a gold-containing solid in the catholyte;
separating the ore particles from the anolyte to obtain a leach liquor;
separating the gold-containing precipitate from the catholyte to collect the gold-containing precipitate and obtain bromide-containing barren solution for reuse as an aqueous bromide feed solution.

More preferably, the feeding of an anolyte to the anodic compartment includes the circulation of an anolyte stream between the anodic compartment and a leach reactor where ore particles were mixed with the aqueous bromide solution; and the feeding of the catholyte to the catholyte compartment includes the circulation of a catholyte stream between the cathodic compartment and a reactor accommodating pregnant leach solution.

A leach liquor and bromide-containing barren solution that are separated from the anolyte stream and catholyte stream, respectively, can be used in a subsequent operation as feed solutions for the cathodic side and anodic side of the electrochemical cell, respectively.

The aforementioned approach is shown in FIG. 2, which illustrates a process based on solubilization of $Au^{(0)}$ from the ore by the action of electrolytically-generated bromine, with simultaneous electrochemically-driven precipitation of the valuable metal from a pregnant leach solution (obtained in a previous run) under alkaline pH. The major components of the apparatus shown in FIG. 2 are electrochemical cell (1) divided into anodic and cathodic compartments (2 and 3, respectively). A first circulation loop (4) provides a flow path between the anodic compartment (2) and an agitated tank (5) equipped with suitable agitation means. Tank (5) serves as a leaching reactor. A second circulation loop (6) provides a flow path between the cathodic compartment (3) and an agitated tank (7), where the pregnant leach solution is held.

A suspension consisting of the refractory gold ore and water is charged to the reactor via feed line (8). The sulfide content of refractory ores that are leachable by the process of the invention varies from 0.5 to 30 wt %, e.g. from 1 to 10%, e.g., from 1 to 5 wt %. The weight ratio solid/water may be in the range from 1:10 to 1:2. The refractory gold ore is amenable to leaching in a ground form, but very fine milling is not necessary and crushing the ore down to particle size distribution (measurable by laser diffraction) of $D_{90} \le 750$ μm and $D_{50} \le 200$ μm was shown to achieve good results on a laboratory scale.

The slurry flows along circulation loop (4), between the tank/leaching reactor (5) and the anodic compartment (2) with the aid of a pump used for transport of a slurry. On a laboratory scale, the flow rate of the anolyte stream is from 30 to 90 ml/min. Solid/liquid separation unit (9), e.g., filtration unit or gravity separator, is in fluid communication with the slurry flow (e.g., circulation loop (4)), to enable the separation of the particulate, gold-depleted ore (10) from the aqueous phase, generating an aqueous stream consisting of the pregnant leach solution (11) that is collected and used in a subsequent leaching run.

A pregnant leach solution which was obtained from a previous leaching operation is added to tank/reactor (7). The pregnant leach solution constitutes the catholyte stream which is circulated between tank (7) and the cathodic side (3) of the cell by means of a suitable pump (not shown). On a laboratory scale, the flow rate of the catholyte stream is from 30 to 90 ml/min. Water reduction occurring at the cathode leads to formation of hydroxide ions concurrently with the evolution of hydrogen which is vented from the system (the evolving hydrogen may possibly be used for various purposes), as well as bromine reduction to bromide (the residual bromine that was carried into the PLS). A precipitate progressively accumulates in the catholyte stream under the cathodically-generated alkaline environment at pH of not less than 7.5, e.g., not less than 8, e.g., in the range from 8 to 12, preferably from 8.5 to 11.5, e.g., from 9 to 11, ~9.5 to 10.5. Flow circulation loop (6) is equipped with solid/liquid separation unit (12) to collect the solid precipitate (13) and the barren solution (14). The barren solution can be replenished by addition of fresh bromide source (not shown) and used as a feed stream in a subsequent leaching operation to supply the bromide component of the bromine/bromide lixiviant.

Large scale processes, say, leaching of 100 ton ore/hour may typically require the circulation of about 200-500 $m^3$/hour of anolyte and catholyte streams. In operation, an anolyte stream consisting of a mixture of the refractory ore and an aqueous alkali bromide, and a catholyte stream consisting of pregnant leach solution produced in a previous run are recirculated continuously in flow loops (4 and 6, respectively) of the apparatus shown in FIG. 2. The anolyte gradually acquires the characteristic red-brown color of the anodically-generated bromine; the leaching occurring with the aid of the anodically generated bromine continues until the level of solubilized gold reaches a predetermined threshold. Then the operation of the cell is halted and the anolyte is discharged to separation unit (9) to collect a leach liquor (11) (e.g., to be used as a catholyte stream in another run). Likewise, catholyte is periodically sampled to determine the concentration of gold in the aqueous phase. Separation unit (12) is activated in response to a signal indicating that essentially all solubilized gold has been eliminated from the aqueous phase. Gold-containing solids (13) are subsequently treated by known metallurgy methods to isolate the precious metal, whereas the barren solution (14) is delivered for storage until next run.

FIG. 3 illustrates a further process design allowing a continuous mode of operation based on the concept shown in FIG. 2. This variant of the process comprises directing the leach liquor that is separated from the anolyte stream to the circulation of the catholyte stream, and using the barren solution that is separated from the catholyte stream as feed solution in the circulation of the anolyte stream.

After a start-up phase and once steady state conditions are reached, the leach liquor (11), collected upon separating the anolyte stream into solid and liquid phases in separation unit (9), is delivered to the pregnant leach solution reactor (7). Likewise, the barren solution (14), collected upon separating the catholyte stream into solid and liquid phases in separation unit (12), is used to supply aqueous bromide to the anodic side of the cell.

Accordingly, another aspect of the invention is a process for recovering gold from a refractory gold ore in an electrolytic cell having anode and cathode compartments, comprising the steps of:

circulating an anolyte stream through the anodic compartment, the anolyte stream consisting of a mixture of the ore particles and an aqueous bromide solution, wherein bromine is produced at the anode by oxidation of the bromide, thereby dissolving gold in the aqueous phase;

circulating a catholyte stream through the catholyte compartment, the catholyte stream consisting of $AuBr_2^-$ and/or $AuBr_4^-$ ions-containing pregnant leach solution, that was obtained after leaching a refractory gold ore with aqueous bromine/bromide lixiviant, thereby producing in the catholyte a gold-containing precipitate;

separating the ore particles from the anolyte stream to obtain a leach liquor and using said leach liquor as a feed solution for the cathodic compartment, separating the gold-containing precipitate from the catholyte stream, to obtain bromide-containing barren solution, and using said barren solution as a bromide feed solution for the anodic compartment.

The design of the electrolytic cell (1) and its operation, in terms of electrode materials, their spatial configuration, voltage and current density applied, shall now be described in more detail.

The anode (A) and cathode (C) mounted in the electrolysis cell (1) are connected to a power source supplying direct current (not shown). The cell operates at voltage that is in the range from 1 to 9 V, e.g., 3 to 8 V, at a current density of 5 $mA/cm^2$-100 $mA/cm^2$, e.g., 10 $mA/cm^2$-20 $mA/cm^2$. Anode (A) may be made of graphite (generally preferred owing to its low cost and its good durability when exposed to bromine) or suitable metals, including oxide-coated transition metal electrodes (e.g., $RuO_2$ and $IrO_2$ coated electrodes), for example, coated titanium or titanium alloyed with other metals. Cathode (C) may be made of graphite or a titanium alloy (e.g., titanium grade 7). A divided cell configuration is created using a separator in the form of ion exchange membrane (like Nafion®) placed in the space between the electrodes to divide the cell to cathode and anode compartments, or diaphragm (for example, microporous separator made of glass microfibers or screens made of inert materials such as polyvinylidene fluoride (PVDF)), to provide a physical barrier between the electrodes and prevent passage of the solids between the compartments.

The electrodes are preferably flat, plate-shaped, and are positioned in parallel to each other. In lab-scale set-ups, good results were obtained with electrodes that are spaced about 3 mm to 7 mm apart, with each electrode providing about 5-300 $cm^2$ of active surface area. Large scale production generally requires the operation of an electrolytic unit with a plurality of individual cells i.e., by installation of a large number of anodes and cathodes that are alternately positioned across the width of the electrolytic unit and are electrically connected to the opposing poles of the source of direct current. The inlet and outlet openings of the electrolytic unit are coupled to suitable pipe manifolds to uniformly divide the flow of anolyte and catholyte into the spaces between adjacent electrodes, and to collect and guide the outgoing streams.

Electrolytic cells with cylindrical symmetry can also be used, that is, with a housing enclosing anode and cathode compartments which are coaxially and concentrically positioned to provide annular spaces (e.g., the inner compartment is the anode compartment) into which the anolyte and catholyte can be loaded, or through which the anolyte and catholyte streams are caused to recirculate. One or more rod-shaped anodes and one or more rod-shaped cathodes are mounted in the respective compartments.

As pointed out above, techniques to win the gold from the solid precipitate that has been separated from the pregnant leach solution under alkaline environment are generally known. The solid can be treated on/off site with standard hydrometallurgical processes as re-leaching, concentration, separation and recovery. Techniques such as pH alteration, solvent extraction, absorption via ion exchange or activated carbon can be used for the above. See for example description of suitable techniques in The Chemistry of Gold Extraction; John Marsden, Iain House; SME, 2006. It should be noted that the solid precipitate may include other metals in addition to gold, as indicated by the experimental results reported below, such as Mn, Ni and Sb. Hence the method of the invention is of potential benefit of recovering gold and other valuable metals from ores.

IN THE DRAWINGS

EXAMPLES

In the refractory gold ore studies reported below, an ore obtained from a gold mining site in Kyrgyzstan was tested. The ore was analyzed to determine its metal constituents. Analysis reported herein was performed using 1) Fire Assay Gold Analysis: FAA505: 50 g fire assay, Atomic Absorption finish, Gold; and 2) Multi Elements ICPMS: IMS40B: 4 acid digestion, ICPMS, Finish, Multi Elements (49 elements). Results are set out in Table 1.

TABLE 1

| element | concentration | units |
|---|---|---|
| Al | 4.46 | % |
| As | 1.34 | % |
| Fe | 4.15 | % |
| Ca | 2.60 | % |
| S | 2.6 | % |
| Ag | 18 | ppm |
| Au | 4.12 | ppm |
| Cu | 436 | ppm |

Ore samples were milled; the particle size distribution set out below was obtained (measured by laser diffraction using Malvern PSD 3000): $D_{90}$=720 µm, $D_{50}$=169 µm, $D_{10}$=4.45 µm. The crushed ore was used in the leaching studies.

Example 1 (Comparative)

Leaching Refractory Gold Ore by Addition of Aqueous $Br_2/Br^-$ Lixiviant to the Leach Reactor Gold leaching from refractory ore was tested by mixing 120 gr bromine/bromide leach solutions with 60 gr of refractory ore samples in 0.5 L glass bottles. Leach solutions with varying bromine/bromide concentrations were used, as tabulated below, to determine the level of gold leaching with increasing loading of bromine/bromide. After 30 minutes of mixing, the content of the vessel was filtered on a glass fiber filter, and the depleted ore was analyzed by fire assay. Test conditions and results are set out in Table 2.

TABLE 2

| Concentration of leach solution $[Br_2]$;$[Br^-]$ (wt %) | Total Br2 (g/100 g ore) | Total NaBr (g/100 g ore) | Gold leaching (%) |
|---|---|---|---|
| 5%;5% | 10/100 | 10/100 | 0.7% |
| 10%;10% | 20/100 | 20/100 | 9.1% |
| 20%;20% | 40/100 | 40/100 | 86.1% |

The results indicate that high volumes of bromine/bromide aqueous reagent are needed to reach acceptable leaching level.

Examples 2 and 3

Figure 4:
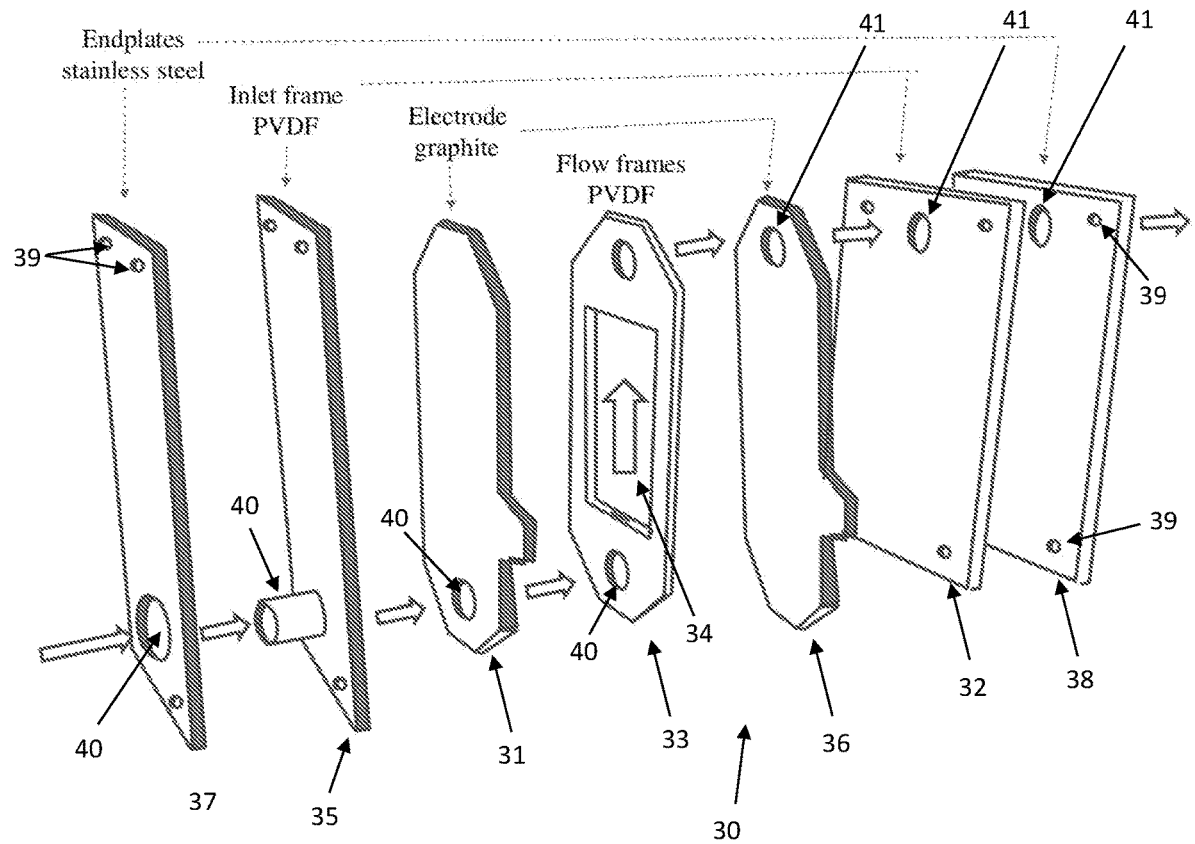
FIG. 4 is an illustration of an electrochemical cell used in the experimental work.

Leaching Refractory Gold Ore with the Aid of Electrolytically Generated Aqueous $Br_2/Br^-$ Reagent The experimental set-up used for the leaching tests included a 1 L glass reactor equipped with Ika Eurostar 60 mixer and an electrochemical cell (Electro MP Cell from ElectroCell), connected with a peristaltic pump (WATSON MARLOW323 D) to enable circulation of a slurry consisting of sodium bromide solution and the particulate ore between the reactor and the electrochemical cell. A side view of the individual elements used to assemble the electrochemical cell (30) are shown in FIG. 4. The graphite electrode plates are indicated by numerals (31), (36). A flow frame (33) made of polyvinylidene fluoride (PVDF) is positioned between the pair of electrodes, which are spaced 5 mm apart. The open area (34) of the PVDF frame provides the flow space for the electrolyzed solution, to be exposed to the potential applied across electrodes; the active area of each electrode is 204 $cm^2$. The other (non-active face) of each electrode is stacked to PVDF plate (35, 32), interposed between the electrode and a first (37) and second (38) end plates made of stainless steel which are positioned across the respective ends of the structure. Openings to receive mounting bolts (39) are located at the corners of the end plates and the PVDF plates, to allow the entire set of plates to be held together tightly. On juxtaposing the individual plates together, a passage is created through openings (40) to direct incoming stream of slurry from the reactor into space (34). Outgoing stream is returned to the reactor via a passage created by openings (41) (direction of fluid flow is marked by arrows).

The glass reactor was charged with sodium bromide solution. The ore is added gradually with stirring (100 rpm). The peristaltic pump was then turned on (150 rpm), and the stirring velocity at the reactor was lowered to 70 rpm; the circulation flow rate was 55 ml/min. After 5 minutes, the operation of the electrochemical cell began; the cell was operated at a constant amperage of 2 A. The circulated solution acquired a red-brown hue indicating the formation of bromine. At the end of the experiments, the slurry was discharged from the reactor and filtered. Gold leaching from the depleted ore was measured by fire assay method. The exact test conditions and results are set out in Table 3.

TABLE 3

| Example | Ore (g) | Leaching solution | Circulation time | Current | gold leaching (%) |
|---|---|---|---|---|---|
| 2 | 200 | 800 g of 20 wt % NaBr solution | 17 hours | 2 A | 79.5 |
| 3 | 100 | 900 g of 5 wt % NaBr solution | 8.5 | 2 A | 81.3 |

Example 4

Separation of Gold from Pregnant Leach Solution in Electrochemically-Created Alkaline Environment A pregnant leach solution containing 0.11 ppm of gold (measured by ICP-MS) was introduced into an undivided electrochemical cell (Electro MP Cell from ElectroCell). The area of each of the two electrodes mounted in the cell was ~200 cm. The electrodes were spaced 5 mm apart. A voltage of 4 V was applied. During the process, the pH of the solution changed to alkaline, reaching a pH of about 8.73. Formation and settling of solids was observed in the electrochemical cell. After 6 hours, the cell content was discharged and filtered. The gold concentration measured in the filtrate (glass microfiber filter disc from Sartorius was used for the filtration) was 10 ppb; hence 91% gold recovery was determined.

Example 5

Figure 5:
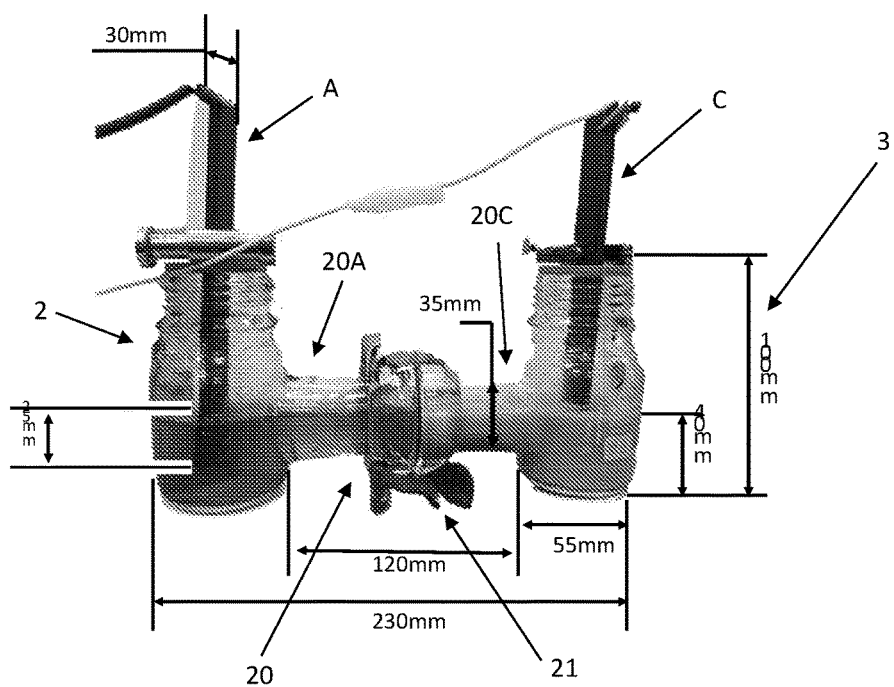
FIG. 5 is a photo of H-shaped cell used in the experimental work.

Leaching Gold from Refractory Ore Using Electrolytically Generated $Br_2$ in Anodic Half-Cell with Simultaneous Separation of Gold from Pregnant Leach Solution in Cathodic Half-Cell The experimental set-up is shown in FIG. 5. The H-shaped electrochemical cell (1) consists of an anode compartment (2) and cathode compartment (3), each in the form of an essentially cylindrical glass flask, about 100 mm high with outer diameter of 55 mm and inner diameter of 50 mm. The two vessels are connected by a passage (20), consisting of two parts (20A) and (20C) extending from the lateral surfaces of the anodic and cathodic cylindrical flasks, respectively; the parts are joined together to create a passage which is 120 mm long, with a diameter of ~35 mm. Hence the total length of the H-shaped electrochemical cell is 230 mm. The compartments are separated by a glass microfiber disc from Sartorius (90 mm) placed transversely in the middle of the passage (21) joining the two compartments; the disc blocks transfer of solid particles from one side to another via the passage joining the flasks.

The anode (A) and the cathode (C) are made of graphite plates i.e., 150 mm long, 30 mm wide, 5 mm thick plates. In operation, the liquid level in the H-shaped electrochemical cell is 40 mm. The anode and cathode are submerged in the anolyte and catholyte, respectively, such that the lowermost end of the electrode is 15 mm above the bottom of the flask; hence the active area for each electrode is 30 mm×25 mm. The electrodes are positioned concentrically in the cylindrical flask, that is, the longitudinal axis of the electrode is coaxial with the cylindrical flasks, thus the electrodes are spaced 17 cm apart (face-to-face distance). Anode (A) and cathode (C) are electrically connected to a source of direct current (not shown).

The crushed sample (8.25 g) and 4 wt % aqueous sodium bromide solution (80 g) were added to the anodic compartment. A previously obtained pregnant leach solution (72.5 g) was loaded into the cathode side.

Electric potential of 8V was applied between the electrodes for 3.5 hours. Elemental bromine evolved at the anode side where the ore was suspended in the sodium bromide solution, indicated by the appearance of the characteristic red-brown color. On the cathode side, the solution became hazy. At the end of the experiment, pH at the anode side and cathode side was ~2 and ~12, respectively.

The content of each compartment was separately withdrawn from the cell and filtered to remove the solids (i.e., the metal-depleted ore was removed from the anolyte and the gold-containing precipitate is removed from the catholyte). The clear filtrate from the anodic side and the clear filtrate from the cathodic side were assayed by Inductively Coupled Plasma Mass Spectrometry (ICP-MS) to detect gold (the instrument used was Nexion300XX, PerkinElmer). The results are tabulated in Table 4.

TABLE 4

|  | Anode side | Cathode side |
|---|---|---|
| Initial concentration of Au in the aqueous phase (ppb) | 0 | 23.8 ppb |
| final concentration of Au in the aqueous phase (ppb) | 26 ppb | <10 ppb |

It is seen that in the anodic side, where elemental bromine evolved, leaching from refractory gold ore was achieved, with gold being solubilized in the aqueous leach solution. In parallel, in the cathodic side, under alkaline pH build-up, gold was separated from the aqueous pregnant leach solution.

Example 6

Leaching Gold from Refractory Ore Using Electrolytically Generated $Br_2$ in Anodic Half-Cell with Simultaneous Separation of Gold from Pregnant Leach Solution in Cathodic Half-Cell: SEM-EDS Analysis of the Precipitate Collected in the Cathodic Side The H-shaped electrochemical cell illustrated in FIG. 5 was used in the experiment. The procedure and operation parameters are as described in Example 5.

A crushed sample (10.6 g) and 4% wt % aqueous sodium bromide solution (100 g) were added to the anodic compartment. The cathodic side was charged with a previously obtained pregnant leach solution (101.4 g), spiked with gold dissolved in aqueous bromine/bromide, to investigate the separability of gold under water reduction in the cathodic side.

An electric potential of 8V was applied across the electrodes for 3.5 hours. At the end of the experiment, the content of each compartment was withdrawn from the cell and filtrated to remove the solids. The solid that was formed in the cathode side was gently washed with 45 ml of DD water, dried and analyzed by SEM-EDS microscopy. Images obtained are appended as FIGS. 6 and 7, with the corresponding analysis tabulated alongside the image.

Figure 6:
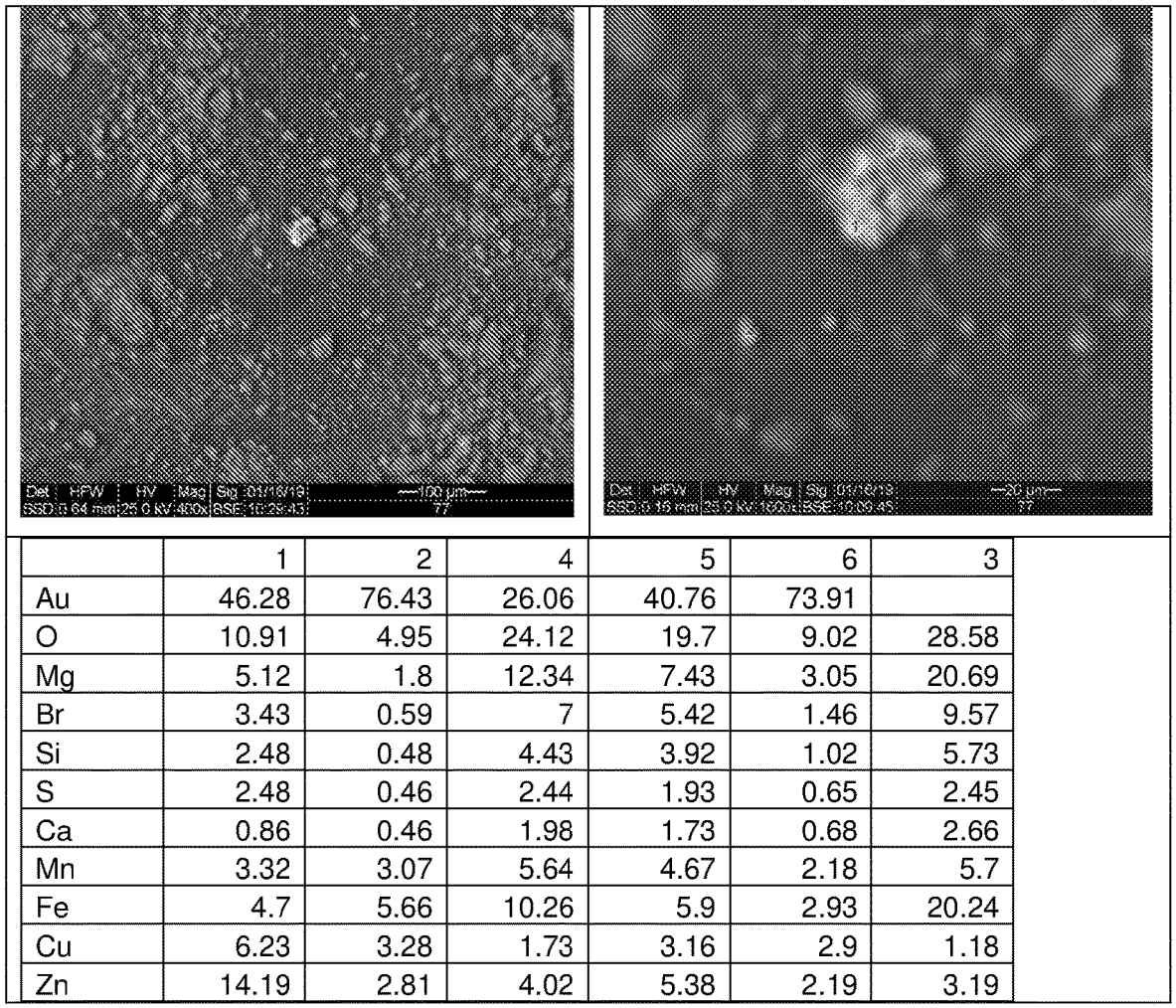
FIG. 6 is SEM-EDS microscopy image of a gold-containing solid recovered by the method of the invention.
Figure 7:
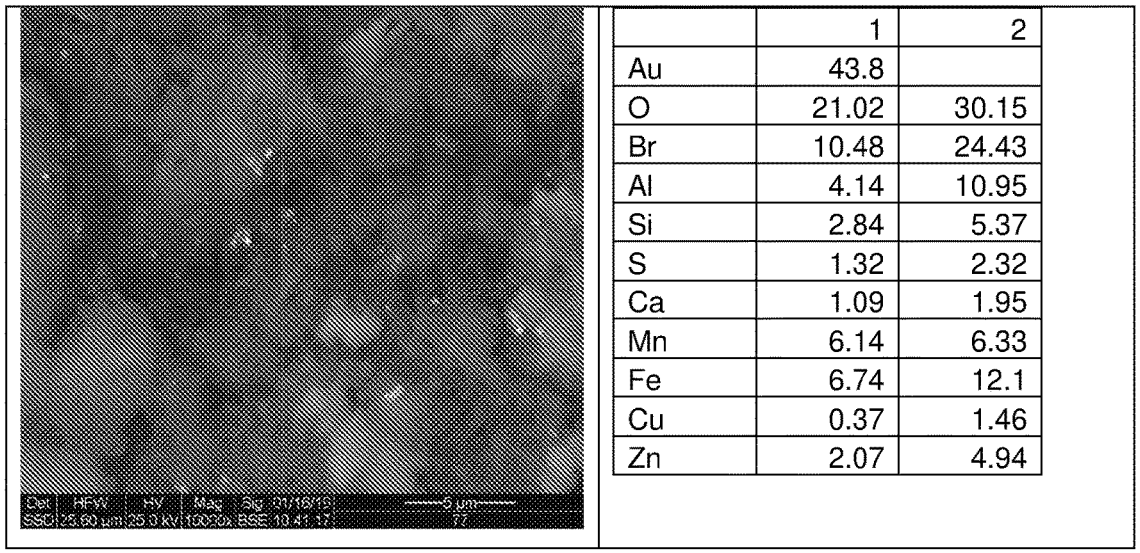
FIG. 7 is SEM-EDS microscopy image of a gold-containing solid recovered by the method of the invention.

In the left image of FIG. 6, there is seen a light region approximately in the middle of the image. The region and some additional points in its environment were examined to determine the chemical elemental composition (total of six points—see the right image). The results tabulated indicate that gold is separable from an aqueous pregnant leach solution under alkaline pH build-up in the cathodic side; gold settled in a particulate form within non-gold containing particles. FIG. 7 and the corresponding chemical composition also indicate the presence of gold-rich region (point 1) as opposed to gold-free region (point 2) in the solid produced at the cathodic side.

Example 7

Figure 1:
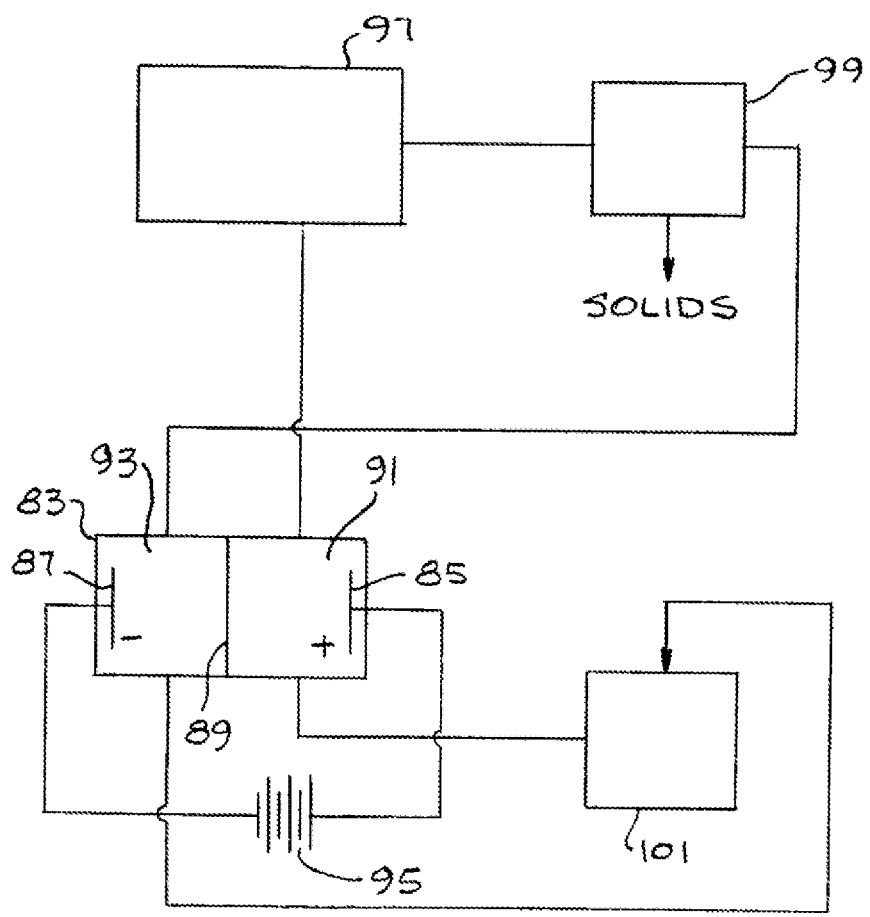
FIG. 1 is a process design according to the prior art EP 476862.
Figure 2:
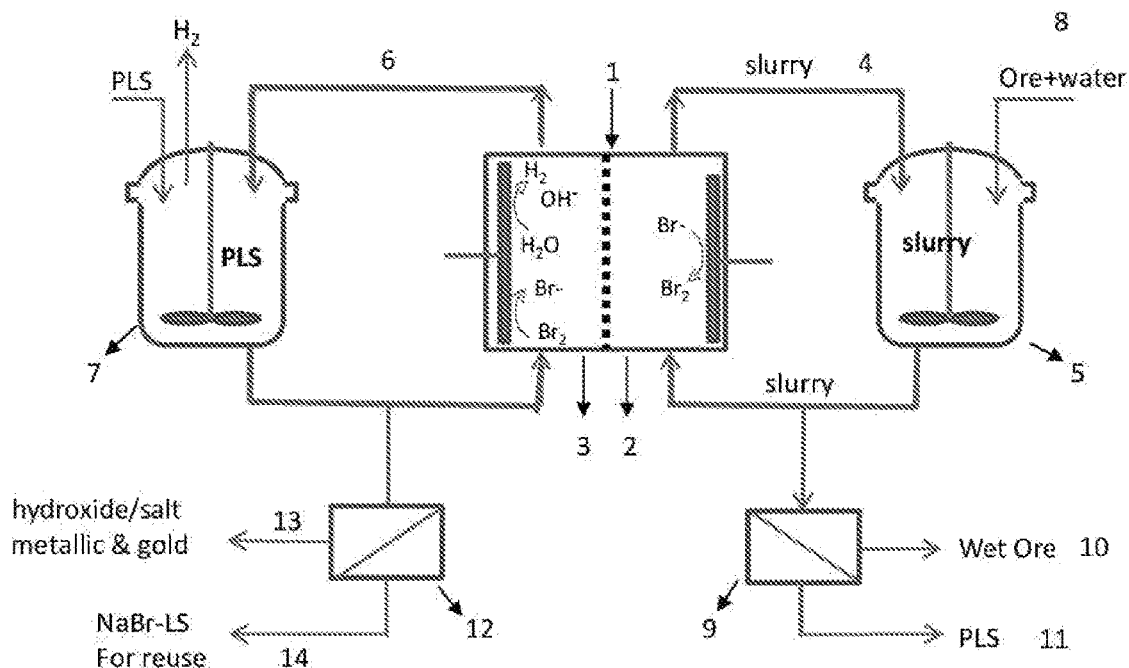
FIG. 2 is a process design according to one variant of the invention.
Figure 3:
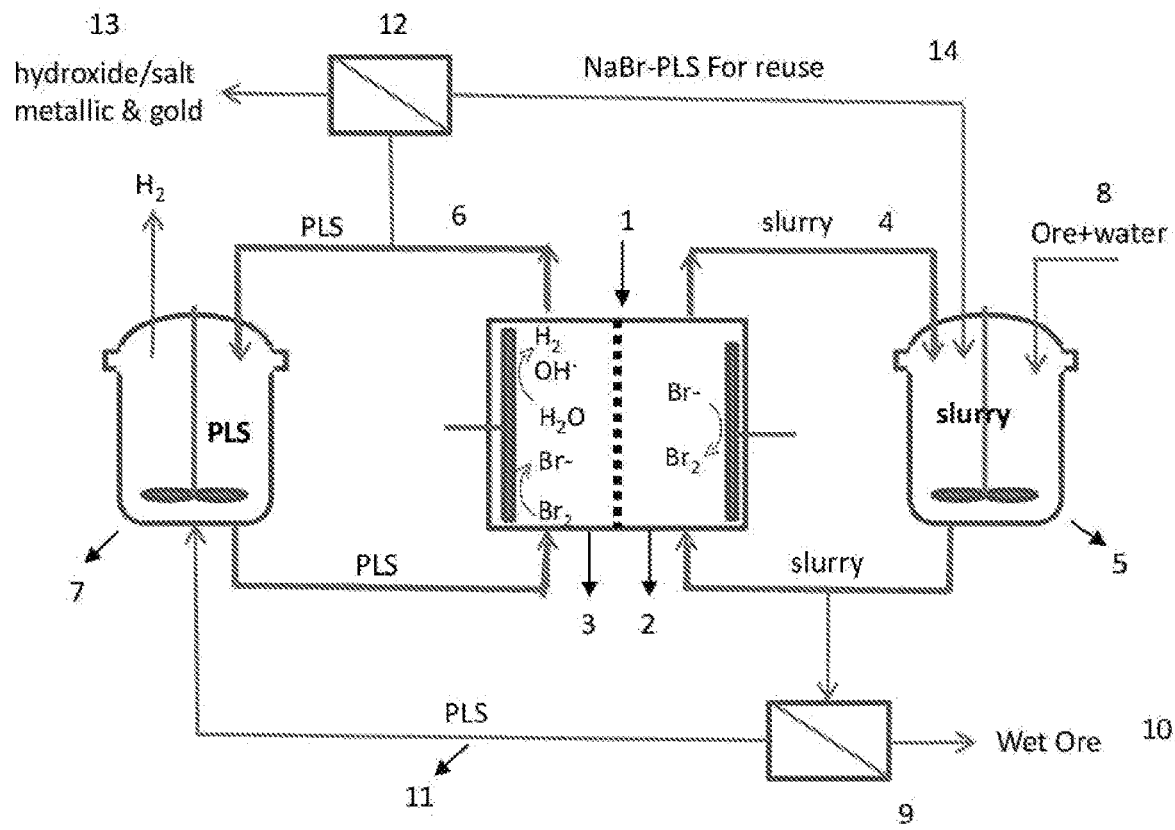
FIG. 3 is a process design according to another variant of the invention.

Leaching Gold from Refractory Ore Using Electrochemically-Generated $Br_2$ with Simultaneous Separation of Gold from Pregnant Leach Solution Under Electrochemically-Generated Alkaline Environment: A Process Design Based on Circulated Anolyte and Catholyte Streams The experimental set-up used in this example is shown schematically in FIG. 2. It includes an electrochemical flow cell (1) divided into anodic and cathodic compartments (2 and 3, respectively). The electrochemical cell (1) used in the experiment is the one described in detail in Examples 2 and 3. In this experiment the cell was divided with Daramic separator into two compartments. Each compartment is equipped with a peristaltic pump (WATSON MARLOW323 D) to enable circulation of a slurry consisting of sodium bromide solution and the particulate ore between tank (5) and the anodic compartment (2), and the circulation between the PLS held in tank (7) and the cathodic compartment (3). In the experiment, tank (5) was a 1 L glass reactor equipped with Ika Eurostar 60 mixer and tank (3) a round-bottomed flask.

An ore was introduced into the 1 L glass reactor (5). The ore sample had 2.14 ppm gold content; it consisted of 50% fresh ore and 50% of depleted ore. Aqueous sodium bromide (800 g of 4 wt % solution) was added to reactor (5). The slurry was kept under stirring at 130 rpm. PLS from a previous run (856 g, gold content 75 PPB) was charged into the round-bottomed flask (7).

Figure 8:
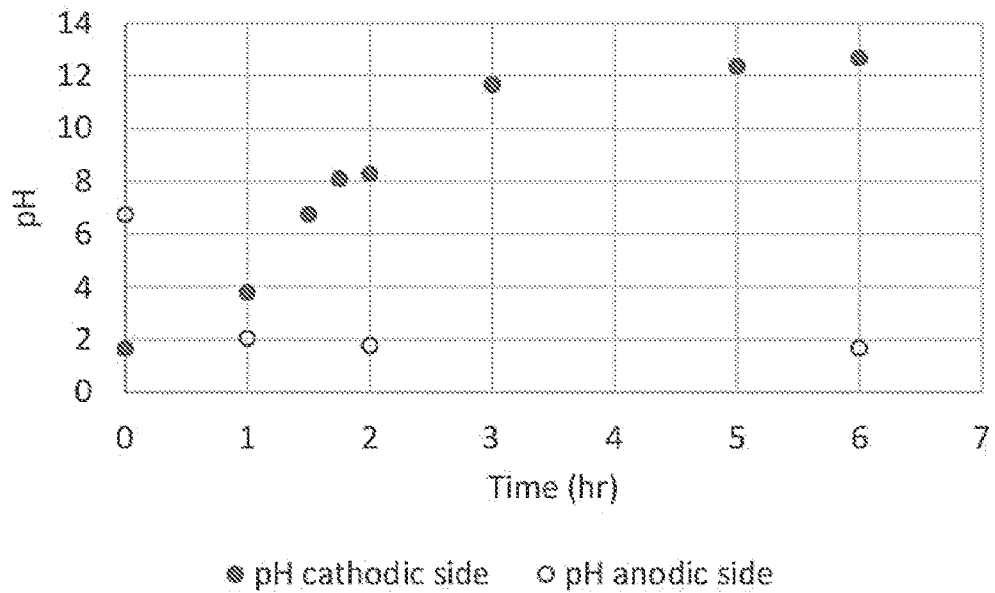
FIG. 8 is pH versus time plot measured in the anodic and cathodic sides of an electrochemical cell operated by the method of the invention.

The anolyte and catholyte streams were pumped by their respective peristaltic pumps at 100 rpm. The cell current was set to 2 A and the experiment lasted 6 hours. pH variation was recorded periodically for the anodic and cathodic sides. The pH versus time plots in FIG. 8 show the built-up of an alkaline environment in the cathodic side.

At the end of the experiment, the depleted ore was recovered by filtration from the anodic side and analyzed by fire assay to determine the metals content remained in the ore. In the fire assay it was found that gold concentration in the ore was reduced to 0.46 ppm gold, indicating 79% of the gold was leached with the aid of the electrolytically-generated bromine.

The precipitate formed in the cathodic side was isolated by filtration. The precipitate and its mother liquor (the filtrate of the cathodic side) were submitted to ICP analysis to determine the amount of metal separated from the PLS under the alkaline conditions. The ICP analysis indicates that 63% of the gold was recovered (28 PPB gold measured in the filtrate). The gold content in the precipitate collected was ~1 ppm. ICP analysis detected other metals that were recovered alongside gold, as tabulated below.

TABLE 5

| Element | concentration | units | Element | concentration | units |
|---------|---------------|-------|---------|---------------|-------|
| Ag | 13 | ppm | Na | 3.75 | % |
| Al | 1.32 | % | Ni | 97 | ppm |
| As | 1.35 | % | Pb | 0.19 | % |
| Cd | 31 | ppm | Sb | 464 | ppm |
| Cu | 473 | ppm | Sr | 110 | ppm |
| Fe | 7.35 | % | Ti | 25 | ppm |
| Mg | 4.78 | % | V | 11 | ppm |
| Mn | 0.92 | % | Zn | 0.49 | % |

Example 8

Metals Recovery from PLS Under pH Variation

Figure 9:
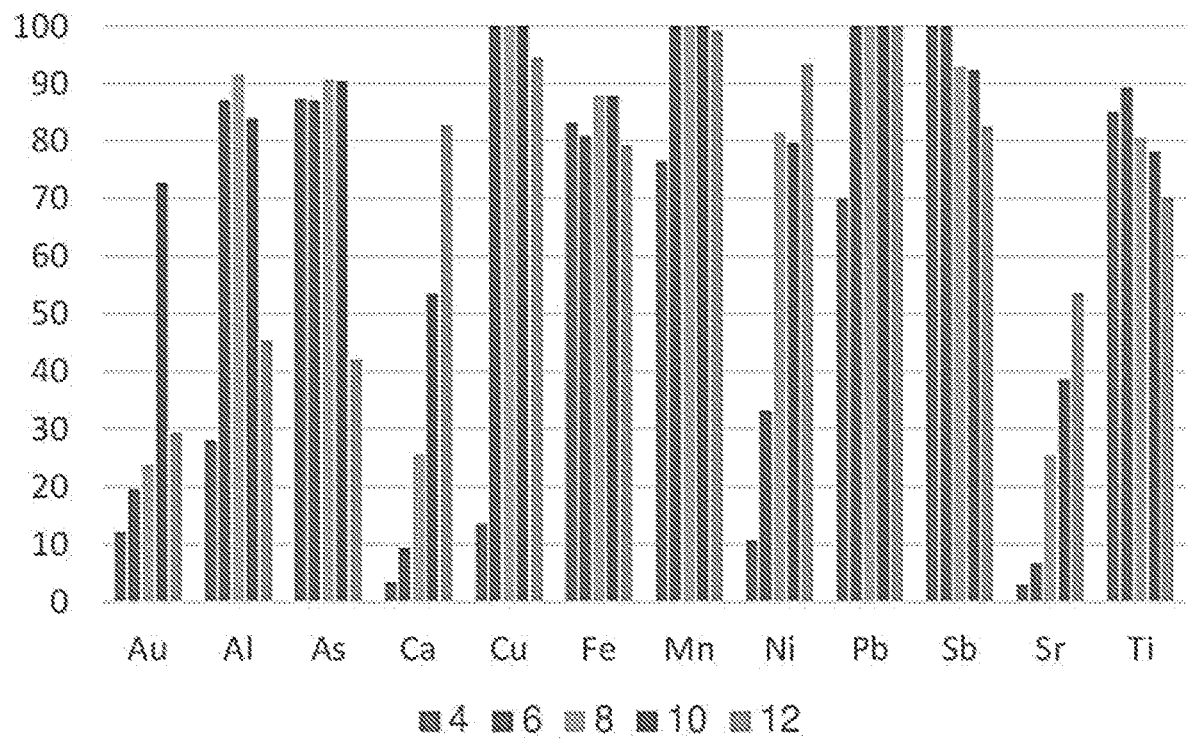
FIG. 9 is a bar diagram showing separability of metals from PLS as function of pH.

In the next set of experiments, recovery of different metals from PLS mix was measured as function of pH, to determine optimal pH for metals separation. To 100 grams samples of PLS mix was added sodium hydroxide to reach a target pH (the pH range investigated was from 4 to 12 at increments of two pH units, namely, at pH=4, 6, 8, 10 and 12; solutions with pH=4, 6, 8 and 10 were formed by addition of 10% aqueous NaOH solution to the PLS sample; the solution with pH=12 was prepared by addition of aqueous and solid NaOH). Then solids precipitated were separated by filtration from each sample and metal content was determined by ICP analysis. Results are shown in the form of a bar diagram in FIG. 9. It is seen that separability of gold reaches maximum values at around pH=10; pH increase to 12 could lead to a drop gold recovery.

The invention claimed is:

1. A process for recovering gold from a sulfide-containing refractory gold ore in an electrolytic cell having anodic and cathodic compartments, the process comprising:
    feeding an anolyte to the anodic compartment, the anolyte being a mixture of the ore particles and an aqueous bromide solution;
    feeding a catholyte to the catholyte compartment, the catholyte being $AuBr_2^-$ and/or $AuBr_4^-$ ions-containing pregnant leach solution, which was obtained after the leaching of the sulfide-containing refractory gold ore with an aqueous bromine/bromide lixiviant;
    applying an electrical voltage across the electrodes so as to oxidize bromide to bromine at the anode to dissolve gold in the anolyte and reduce water at the cathode to create an alkaline environment and precipitate a gold-containing solid in the catholyte;
    separating the ore particles from the anolyte stream to obtain a leach liquor;
    separating the gold-containing precipitate from the catholyte to collect the gold-containing precipitate and obtain bromide-containing barren solution for reuse as an aqueous bromide feed solution.

2. A process according to claim 1, wherein the feeding of the anolyte to the anodic compartment includes the circulation of an anolyte stream between the anodic compartment and a leach reactor where ore particles were mixed with the aqueous bromide solution; and the feeding of the catholyte to the catholyte compartment includes the circulation of a catholyte stream between the cathodic compartment and a reactor accommodating pregnant leach solution.

3. A process according to claim 2, comprising directing the leach liquor that is separated from the anolyte stream, to the circulation of the catholyte stream, and using the barren solution that is separated from the catholyte stream as feed solution in the circulation of the anolyte stream.

4. A process according to claim 1, wherein the sulfide content of refractory ore is from 1 to 10 wt %.

5. A process according to claim 1, where the alkaline environment at which gold-containing solid is precipitated is at pH in the range from 7.5 to 11.5.

* * * * *